US012777534B2

(12) United States Patent
Takagi

(10) Patent No.: US 12,777,534 B2
(45) Date of Patent: Oct. 27, 2026

(54) WIRELESS COMMUNICATION DEVICE AND CONTROL METHOD THEREFOR

(71) Applicant: CANON KABUSHIKI KAISHA, Tokyo (JP)

(72) Inventor: Toshiyuki Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 292 days.

(21) Appl. No.: 18/629,021

(22) Filed: Apr. 8, 2024

(65) Prior Publication Data

US 2024/0260098 A1 Aug. 1, 2024

Related U.S. Application Data

(63) Continuation of application No. PCT/JP2022/033556, filed on Sep. 7, 2022.

(30) Foreign Application Priority Data

Oct. 29, 2021 (JP) ................................ 2021-178078

(51) Int. Cl.
*H04W 76/10* (2018.01)

(52) U.S. Cl.
CPC .................................. *H04W 76/10* (2018.02)

(58) Field of Classification Search
CPC .................................................... H04W 76/10
USPC .......................................................... 370/329
See application file for complete search history.

(56) References Cited

U.S. PATENT DOCUMENTS

| | | | | |
|---|---|---|---|---|
| 10,701,545 B2 * | 6/2020 | Jiang | H04B 5/48 | |
| 11,632,738 B2 * | 4/2023 | Indurkar | H04W 76/11 | 370/329 |
| 11,659,572 B2 * | 5/2023 | Bai | H04L 5/0051 | 370/329 |
| 11,671,829 B1 * | 6/2023 | Radhakrishnan | H04L 63/0442 | 713/156 |
| 11,689,951 B2 * | 6/2023 | Bao | H04L 5/005 | 370/329 |
| 11,736,175 B2 * | 8/2023 | Nagaraj | H04B 10/25759 | 370/329 |
| 11,758,389 B2 * | 9/2023 | Amin | G06F 21/33 | 370/329 |
| 11,778,451 B2 * | 10/2023 | Paczkowski | H04L 63/123 | 370/329 |
| 11,792,771 B2 * | 10/2023 | Wang | H04L 1/0041 | 370/329 |

(Continued)

FOREIGN PATENT DOCUMENTS

| | | | |
|---|---|---|---|
| EP | 3907600 A1 * | 11/2021 | H04L 65/611 |
| EP | 4271044 A1 * | 11/2023 | H04W 48/18 |

(Continued)

*Primary Examiner* — Peter G Solinsky
(74) *Attorney, Agent, or Firm* — Cowan, Liebowitz & Latman, P.C.

(57) ABSTRACT

A wireless communication device and a control method therefor, which realize efficient switching between wireless communication schemes, are disclosed. The wireless communication device includes first wireless communication circuit and second wireless communication circuit. The wireless communication device notifies an external device, using the second wireless communication circuit, that the external device becomes connectable to a network generated by the first wireless communication circuit.

12 Claims, 7 Drawing Sheets

(56) References Cited

U.S. PATENT DOCUMENTS

| | | | | |
|---|---|---|---|---|
| 2015/0100618 | A1* | 4/2015 | Le Guen | G08B 7/066 709/201 |
| 2016/0360503 | A1* | 12/2016 | Rauenbuehler | H04M 3/42263 |
| 2018/0049099 | A1* | 2/2018 | Lee | H04W 72/542 |
| 2020/0211307 | A1* | 7/2020 | Lanza | G07C 9/00182 |
| 2021/0400749 | A1* | 12/2021 | Asakura | H04W 4/80 |
| 2022/0174154 | A1* | 6/2022 | Bohannon | H04L 65/4015 |
| 2022/0330352 | A1* | 10/2022 | Horn | H04L 63/0281 |
| 2023/0080610 | A1* | 3/2023 | Zohoorian | H04W 64/00 370/329 |
| 2023/0086286 | A1* | 3/2023 | Clevorn | H04W 76/15 370/329 |
| 2023/0098627 | A1* | 3/2023 | Martin de la Bastide | H04W 12/06 726/7 |
| 2023/0110581 | A1* | 4/2023 | Bao | H04L 5/0048 370/329 |
| 2023/0115840 | A1* | 4/2023 | Torikura | H04W 52/0229 726/7 |
| 2023/0179982 | A1* | 6/2023 | Goodsitt | H04W 12/50 370/329 |
| 2023/0231950 | A1* | 7/2023 | Bohannon | G07C 11/00 379/209.01 |

FOREIGN PATENT DOCUMENTS

| | | | |
|---|---|---|---|
| JP | 2015073231 | A | 4/2015 |
| JP | 2018006962 | A | 1/2018 |
| JP | 6650793 | B2 | 2/2020 |
| JP | 2020096305 | A | 6/2020 |

* cited by examiner

WIRELESS COMMUNICATION DEVICE AND CONTROL METHOD THEREFOR

CROSS-REFERENCE TO RELATED APPLICATIONS

This application is a Continuation of International Patent Application No. PCT/JP2022/033556, filed Sep. 7, 2022, which claims the benefit of Japanese Patent Application No. 2021-178078, filed Oct. 29, 2021, both of which are hereby incorporated by reference herein in their entirety.

BACKGROUND

Field of the Invention

The present invention relates to a wireless communication device and a control method therefor.

Background Art

Wireless communication devices capable of selectively using a plurality of wireless schemes are known. Japanese Patent No. 6650793 (PTL1) discloses a wireless communication device capable of performing communication using BLE (Bluetooth (registered trademark) Low Energy) and communication using a wireless LAN (Wi-Fi).

According to PTL1, a request for switching from a BLE connection to a wireless LAN connection and information necessary for connecting to the wireless LAN, which is generated in response to the request, are exchanged between a set of wireless communication devices through the BLE connection.

However, according to the conventional technique described in PTL1, the (request source) wireless communication device that has requested switching to a wireless LAN connection is not notified that a wireless LAN has been generated. The request source wireless communication device does not know when to send the connection request to the wireless LAN, and therefore needs to wait for a sufficient period of time or repeatedly transmit the connection request. The result is inefficiency. For example, it takes longer than necessary to connect to the wireless LAN, and power is wasted on unnecessary transmissions.

SUMMARY

In view of the problems of the conventional technique, one aspect of the disclosed embodiments provides a wireless communication device and a control method therefor, which realize efficient switching between wireless communication schemes.

According to an embodiment, there is provided a wireless communication device comprising: a first wireless communication circuit; a second wireless communication circuit; and a controller, wherein the controller notifies an external device, using the second wireless communication circuit, that the external device becomes connectable to a network generated by the first wireless communication circuit.

According to an embodiment, there is provided a wireless communication device comprising: a first wireless communication circuit; a second wireless communication circuit; and a controller, wherein when the controller receives a notification indicating that a network that is connectable by the first wireless communication circuit, from an external device through the second wireless communication circuit, if the notification is a notification provided in response to a request transmitted to the external device, the controller transmits a request to join the network to the external device, using the first wireless communication circuit, and if the notification is not a notification provided in response to the request, the controller does not transmit a request to join the network to the external device, using the first wireless communication circuit.

According to an embodiment, there is provided a control method for a wireless communication device that includes first wireless communication circuit and second wireless communication circuit, comprising: notifying an external device, using the second wireless communication circuit, that the external device becomes connectable to a network generated by the first wireless communication circuit.

According to an embodiment, there is provided a control method for a wireless communication device that includes first wireless communication circuit and second wireless communication circuit, comprising: receiving, by the second wireless communication circuit, from an external device, a notification indicating that a network that is connectable by the first wireless communication circuit has been generated; if the notification is a notification provided in response to a request transmitted to the external device, transmitting a request to join the network to the external device, using the first wireless communication circuit; and if the notification is not a notification provided in response to the request, not transmitting the request to join the network to the external device.

According to an embodiment, there is provided a non-transitory computer-readable medium storing a program that, when executed by a computer included in a wireless communication device that includes first wireless communication circuit and second wireless communication circuit, causes the computer to notify external device, using the second wireless communication circuit, that the external device becomes connectable to a network generated by the first wireless communication circuit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
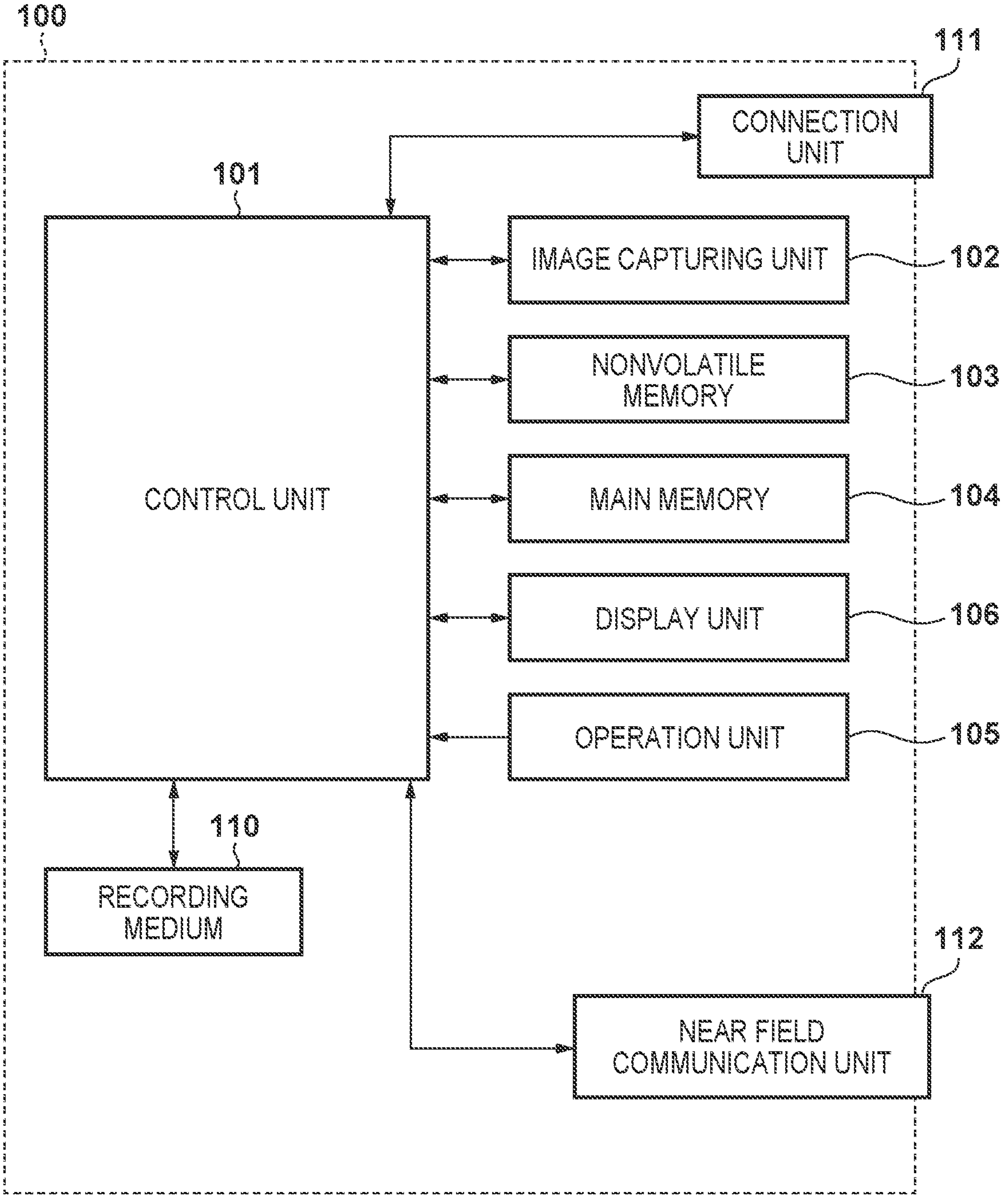
FIG. 1 is a block diagram showing an example of a functional configuration of a digital camera, which is an example of a wireless communication device according to an embodiment.

Hereinafter, embodiments according to the present disclosure will be described in detail, with reference to the accompanying drawings. Note that the following embodiments do not limit the scope of the claims. Additionally, although several features are described in the embodiments, all of these features are not necessarily required for the invention, and multiple features may be combined as desired. Furthermore, in the accompanying drawings, the same or similar configurations are given the same reference numerals, and redundant descriptions thereof will be omitted.

Note that the following describes an embodiment in which the present invention is implemented using a digital camera and a smartphone. However, the present invention does not require an image capturing function or a telephone call function, and can be implemented with any electronic device capable of switching between a plurality of wireless communication schemes. Examples of such electronic devices include video cameras, computer devices (personal computers, tablet computers, media players, PDAs, etc.), cellular phones, gaming machines, robots, drones, drive recorders, and so on. These are merely examples, and the present invention may be implemented with other electronic devices.

First Embodiment

Configuration of Digital Camera 100

FIG. 1 is a block diagram showing an example of a functional configuration of a digital camera 100, which is an example of a wireless communication device according to the present invention.

A control unit 101 includes one or more processors capable of executing programs. The control unit 101 realizes the operation of the digital camera 100, which will be described later, by reading a program stored in a nonvolatile memory 103 into a main memory 104 and executing the program, for example. Note that at least one or more of the functions realized by the control unit 101 executing a program may be implemented by one or more other pieces of hardware.

An image capturing unit 102 includes, for example, an imaging optical system and an image sensor that photoelectrically converts a subject image generated by the imaging optical system into an image signal. The imaging optical system includes a movable lens such as a focus lens and a diaphragm, and the control unit 101 controls the driving of these components. The image sensor has a plurality of pixels arranged two-dimensionally, and each pixel generates an electric charge according to the amount of incident light, thereby converting a subject image into a group of pixel signals (analog image signals). The image sensor may be a CMOS image sensor or a CCD image sensor. The analog image signals are subjected to noise reduction processing and A/D conversion processing, and are thereafter output from the image capturing unit 102 as digital image signals (image data). Note that the image capturing unit 102 may also include other components such as a focal plane shutter and an anti-vibration mechanism. The operation of the control unit 101 is controlled by the image capturing unit 102.

The control unit 101 applies various types of image processing to the image data to generate image data suitable for various settings and uses. Image data generated to be recorded is stored in a data file in a format suitable for the settings and recorded on a recording medium 110.

The nonvolatile memory 103 is electrically rewritable. The nonvolatile memory 103 stores programs executable by the processor(s) of the control unit 101, GUI data such as that for menu screens, various settings of the digital camera 100, unique information, and so on.

A main memory 104 is, for example, a RAM, and is used to temporarily hold programs, data, and so on. A portion of the main memory 104 is used as a video memory for a display unit 106.

A group of input devices used by a user of the digital camera 100 to input instructions to the digital camera 100 are collectively referred to as an operation unit 105. The operation unit 105 includes, for example, a power switch for inputting an instruction to turn the digital camera 100 on or off, a release switch for inputting an instruct to capture a still image, a moving image capturing switch for inputting an instruction to capture a moving image, and a play button for inputting an instruction to play back image data. Furthermore, the operation unit 105 also includes a connection button for starting communication with an external device via a connection unit 111, which will be described later. When the display unit 106 is a touch display, the touch panel of the display unit 106 is also included in the operation unit 105.

Note that the release switch includes a switch (SW1) that is turned on when pressed halfway and a switch (SW2) that is turned on when pressed fully. The control unit 101 recognizes the turning on of SW1 as an instruction to prepare to capture a still image, and the turning on of SW2 as an instruction to start capturing a still image.

When SW1 is turned on, the control unit 101 executes, for example, AF (autofocus) processing, AE (automatic exposure) processing, AWB (auto white balance) processing, EF (flash pre-emission) processing, or the like as an image capture preparation operation. In addition, when SW2 is turned on, the control unit 101 executes a series of still image capturing and recording operations from still image capturing to recording of image data obtained through the image capturing on the recording medium 110 based on exposure conditions determined through AE processing.

The display unit 106 displays image data obtained through image capturing, image data reproduced from the recording medium 110 or the like, GUIs such as menu screens, setting information of the digital camera 100, and so on. The display unit 106 functions as an electronic viewfinder (EVF) as a result of the image capturing unit 102 continuously capturing moving images and the display unit 106 continuously displaying the obtained moving image data. Note that the display unit 106 may be an external device rather than a component of the digital camera 100. When the display unit 106 is an external device, the digital camera 100 outputs display image data or signals in a format that can be displayed by the display unit 106 to the display unit 106.

The recording medium 110 may be, for example, at least one of a removable memory card and a built-in nonvolatile memory. The recording medium 110 is a recording destination of image data obtained by the image capturing unit 102 performing image capturing. Note that a recording destination of image data may be an external storage device that the digital camera 100 can access.

The connection unit 111 (first wireless communication means) is a communication interface for communication with an external device, and is capable of performing communication using at least one wireless communication scheme in the present embodiment. The connection unit 111 may have a wired communication interface such as a USB interface or an HDMI (registered trademark) interface. The connection unit 111 includes components necessary for the communication schemes to be supported. Examples of such components include an antenna, a connector, a modulation/demodulation circuit, a transmission/reception circuit, and so on.

In the present embodiment, it is assumed that the connection unit 111 communicates with an external device using a wireless LAN scheme conforming to a standard such as the IEEE 801.11x series (x is a, b, g, n, ac, ax, etc.). In addition, the connection unit 111 has an access point function to generate a wireless LAN network by itself, and accepts connection requests from external devices with a station function. The operation of the connection unit 111 is controlled by the control unit 101. The connection unit 111 may communicate with an external device using one or more other wireless communication schemes. In addition, there are no particular restrictions on the protocol used for communication over the established wireless connection, and known protocols such as TCP/IP may be used.

Similar to the connection unit 111, a near field communication unit 112 (second wireless communication means) is also a communication interface for communication with an external device. The near field communication unit 112 uses a wireless communication scheme that has a shorter communication range than the wireless communication scheme used by the connection unit 111, to communicate with an external device. In the present embodiment, it is assumed that the near field communication unit 112 performs wireless communication conforming to the Bluetooth (registered trademark) Low Energy standard, but may perform wireless communication conforming to another short-range wireless communication standard. The operation of the near field communication unit 112 is controlled by the control unit 101.

The digital camera 100 (the control unit 101) is capable of communicating with an external device using at least one of the connection unit 111 and the near field communication unit 112. The external devices with which the digital camera 100 can communicate are external devices that support at least one of the communication standard supported by the connection unit 111 and the communication standard supported by the near field communication unit 112.

Configuration of Smartphone 200

Figure 2:
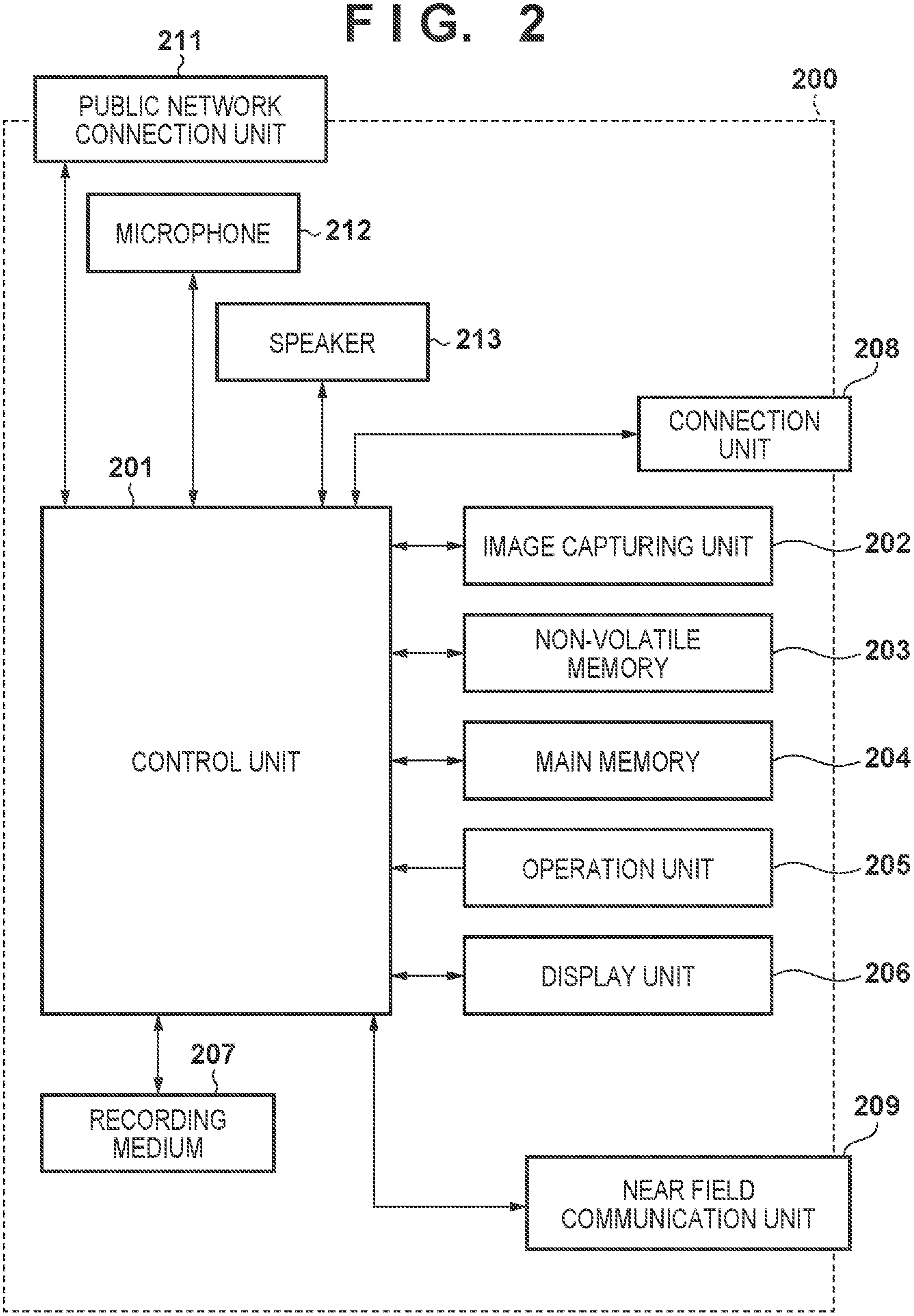
FIG. 2 is a block diagram showing an example of a functional configuration of a smartphone, which is another example of a wireless communication device according to an embodiment.

FIG. 2 is a block diagram showing an example of a functional configuration of a smartphone 200, which is another example of a wireless communication device according to the present invention.

A control unit 201 includes one or more processors that can execute programs. The control unit 201 realizes the operation of the smartphone 200, which will be described later, by reading a program stored in a nonvolatile memory 203 into a main memory 204 and executing the program, for example. Note that at least one or more of the functions realized by the control unit 201 executing a program may be implemented by one or more other pieces of hardware.

An image capturing unit 202 includes, for example, an imaging optical system and an image sensor that photoelectrically converts a subject image generated by the imaging optical system into an image signal. The imaging optical system includes a movable lens such as a focus lens and a diaphragm, and the control unit 201 controls the driving of these components. The image sensor has a plurality of pixels arranged two-dimensionally, and each pixel generates an electric charge according to the amount of incident light, thereby converting a subject image into a group of pixel signals (analog image signals). The image sensor may be a CMOS image sensor or a CCD image sensor. The analog image signals are subjected to noise reduction processing and A/D conversion processing, and are thereafter output from the image capturing unit 202 as digital image signals (image data). Note that the image capturing unit 202 may also include other components such as a focal plane shutter and an anti-vibration mechanism. The operation of the image capturing unit 202 is controlled by the control unit 201.

The control unit 201 applies various types of image processing to the image data to generate image data suitable for various settings and uses. Image data generated to be recorded is stored in a data file in a format suitable for the settings and recorded on a recording medium 207.

The nonvolatile memory 203 is electrically rewritable. The nonvolatile memory 203 stores programs executable by the processor(s) of the control unit 201, GUI data such as that for menu screens, various settings of the smartphone 200, unique information, and so on. The programs include an operating system (OS) and application programs (hereinafter referred to as applications) that run on the OS. In the present embodiment, it is assumed that the nonvolatile memory 203 stores an application that uses communication with the digital camera 100.

A main memory 204 is, for example, a RAM, and is used to temporarily hold programs, data, and so on. A portion of the main memory 204 is used as a video memory for a display unit 206.

A group of input devices used by a user of the smartphone 200 to input instructions to the smartphone 200 are collectively referred to as an operation unit 205. The operation unit 205 includes, for example, a power switch for inputting an instruction to turn the smartphone 200 on or off, and + and − buttons for adjusting the volume. Furthermore, the touch panel of the display unit 206, which is a touch display, is also included in the operation unit 205.

The display unit 206 is a touch display, and displays image data obtained by the image capturing unit 202, image data reproduced from the recording medium 207 or the like, GUIs such as screens provided by the OS, and so on. In the smartphone 200, touch operations on the display unit 206 are basically used to launch an application, operate a GUI provided by the application, and so on.

The recording medium 207 may be, for example, at least one of a removable memory card and a built-in nonvolatile memory. The recording medium 207 is a recording destination of image data obtained by the image capturing unit 202 performing image capturing. Note that a recording destination of image data may be an external storage device that the smartphone 200 can access.

A connection unit 208 is a communication interface for communication with an external device, and is capable of performing communication using at least one wireless communication scheme in the present embodiment. The connection unit 208 may have a wired communication interface such as a USB interface or an HDMI interface. The connection unit 208 includes components necessary for the communication schemes to be supported. Examples of such components include an antenna, a connector, a modulation/demodulation circuit, a transmission/reception circuit, and so on.

In the present embodiment, it is assumed that the connection unit 208 supports a wireless LAN scheme conforming to a standard such as the IEEE 801.11x series (x is a, b, g, n, ac, ax, etc.). Note that the connection unit 208 is only required to support the infrastructure mode and optionally supports the ad hoc mode. The operation of the connection unit 208 is controlled by the control unit 201. Note that the connection unit 208 may support one or more other wireless communication schemes. In addition, there are no particular restrictions on the protocol used for communication over the established wireless connection, and known protocols such as TCP/IP may be used.

Similar to the connection unit 208, a near field communication unit 209 is also a communication interface for communication with an external device. The near field communication unit 209 supports a wireless communication scheme that has a shorter communication range than the wireless communication scheme supported by the connection unit 208. In the present embodiment, it is assumed that the near field communication unit 209 supports wireless communication conforming to the Bluetooth (registered trademark) Low Energy standard, but may support another short-range wireless communication standard. The operation of the near field communication unit 209 is controlled by the control unit 201.

The smartphone 200 (the control unit 201) is capable of communicating with an external device using at least one of the connection unit 208 and the near field communication unit 209. The external devices with which the smartphone 200 can communicate are external devices that support at least one of the communication standard supported by the connection unit 208 and the communication standard supported by the near field communication unit 209.

A public network connection unit 211 is a wireless communication interface for connecting to a cellular network. The smartphone 200 is capable of connecting to a cellular network conforming to 3GPP standards such as 3G, 4G, and 5G via the public network connection unit 211 to make calls with land-line telephones and cellular phones and perform data communication with information processing devices. During a call, the control unit 201 can use a microphone 212 as a voice input device and a speaker 213 as a voice output device. The public network connection unit 211 includes components necessary for the communication schemes to be supported. Examples of such components include an antenna, a modulation/demodulation circuit, a transmission/reception circuit, and so on. The antenna may be shared with the connection unit 208.

Applications stored in nonvolatile memory 203 include a remote control application for the digital camera 100. A user can remotely control the digital camera 100 by operating the remote control application. The remote control application provides a control UI for remotely controlling various functions of the digital camera 100. The control UI is made up of so-called software keys that are operated by means of touch operations performed on the touch panel of the display unit 206. By operating buttons or switches corresponding to a desired function, the user can browse images recorded on the recording medium 110 of the digital camera 100 on the display unit 206 or perform image capturing operations.

Network System Configuration

Figure 3:
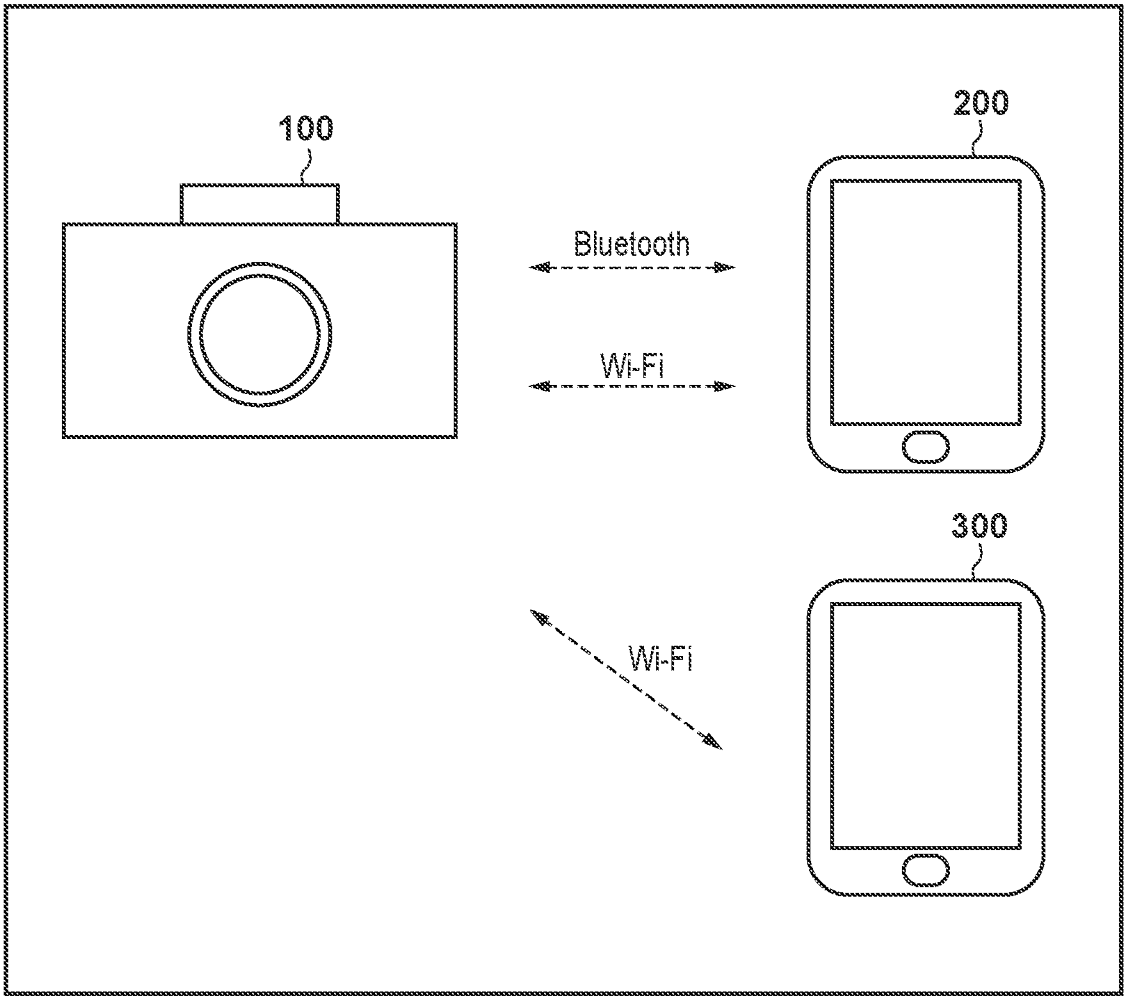
FIG. 3 is a diagram showing an example of a network according to an embodiment.

FIG. 3 is a diagram schematically showing an example of a network system in which the digital camera 100, the smartphone 200, and a smartphone 300 are connected so as to be able to communicate with each other. It is assumed that smartphone 300 has the same configuration as the smartphone 200. In this example, the digital camera 100 and the smartphone 200 can communicate with each other using at least one of: the connection units 111 and 208; and the near field communication units 112 and 209. On the other hand, the digital camera 100 and the smartphone 300 can communicate with each other using the connection units 111 and 208. In the following description, it is assumed that the connection units 111 and 208 communicate with each other via wireless LAN, and the near field communication units 112 and 209 communicate with each other via BLE.

Wireless LAN Connection Establishment Sequence

Next, an example of an operation sequence for establishing a wireless LAN connection between the digital camera 100 and the smartphone 200 in the network shown in FIG. 3 will be described using the sequence diagram shown in FIG. 4. In this example, it is assumed that the digital camera 100 and the smartphone 200 have been paired, the smartphone 200 and the digital camera 100 are within a communication range, and a BLE connection has been established. It is also assumed that a wireless LAN connection has not been established. The following describes example operations of the digital camera 100 and the smartphone 200 performed to establish a wireless LAN connection from this state.

In S401, a remote control application for the digital camera 100 is launched on the smartphone 200, for example. Thus, the control unit 201 of the smartphone 200 requests a wireless LAN connection to the digital camera 100 (requests a so-called handover), using BLE communication through the near field communication unit 209. Note that the request for a wireless LAN connection may be transmitted in response to an event other than launching the remote control application. The control unit 101 of the digital camera 100 receives the connection request.

In S402, the control unit 101 of the digital camera 100 responds to the wireless LAN connection request, using BLE communication through the near field communication unit 112. At this time, the control unit 101 transmits connection information (for example, an SSID and an encryption key) necessary for the smartphone 200 to connect to the wireless LAN network generated by the connection unit 111 to the smartphone 200 using BLE communication.

Note that the connection information necessary for the smartphone 200 to connect to the wireless LAN network generated by the connection unit 111 may be transmitted from the digital camera 100 to the smartphone 200 when the digital camera 100 establishes the BLE connection with the smartphone 200.

In S403, the control unit 101 activates the access point function of the connection unit 111 to generate a wireless LAN network. Specifically, the control unit 101 starts broadcasting a beacon including SSID information. As a result, the smartphone can detect the presence of the network. In addition, the camera becomes ready to accept a request from the smartphone to join the network.

In S404, the control unit 101 transmits an access point activation notification to the smartphone 200, using BLE communication through the near field communication unit 112. As a result, the smartphone recognizes that the camera has generated a wireless LAN network (i.e. the camera has started broadcasting a beacon).

In S405, the control unit 201 of the smartphone 200 uses the connection information transmitted from the digital camera 100 to transmit a request to join the wireless LAN network generated by the digital camera 100 using wireless LAN communication through the connection unit 208. When the smartphone 200 receives a permission response from the digital camera 100 using wireless LAN communication in response to the join request, a wireless LAN connection is established between the digital camera 100 and the smartphone 200. After the wireless LAN connection is established, the BLE connection may be terminated or continued.

Wireless LAN Generation Operation by Digital Camera

The operation of the digital camera 100 through the sequence shown in FIG. 4 will be described in detail using the flowchart shown in FIG. 5. Note that the processing described below is realized by the control unit 101 of the digital camera 100 executing a program to control the components of the digital camera 100.

Figure 5:
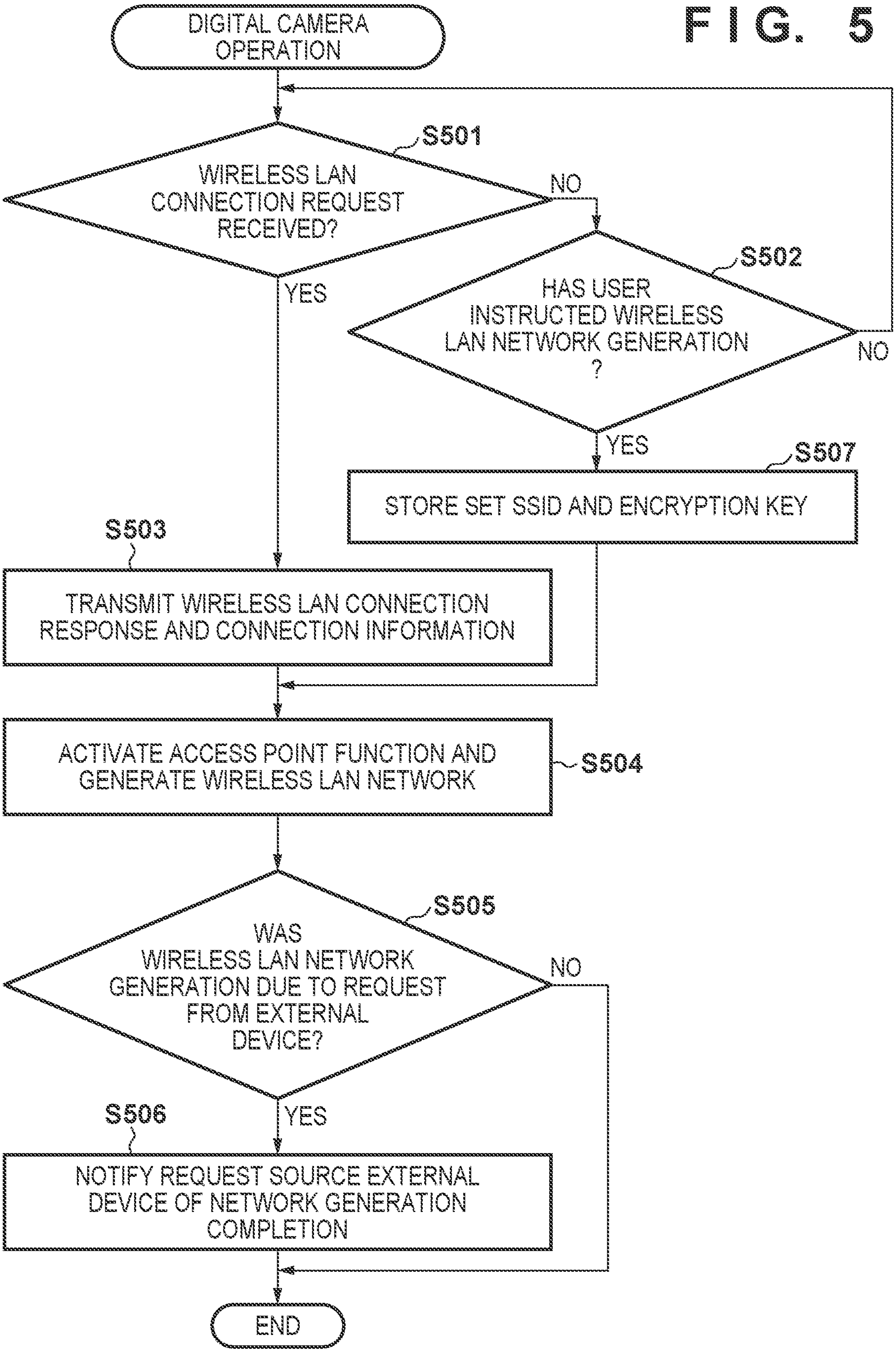
FIG. 5 is a flowchart for a wireless LAN connection operation of a digital camera according to a first embodiment.

The processing shown in the flowchart in FIG. 5 is executed while the control unit 101 is operable and a BLE connection is established with an external device (the smartphone 200 in this example) through the near field communication unit 112.

In step S501, the control unit 101 determines whether or not a wireless LAN connection request has been received from the smartphone 200, using BLE communication. If the control unit 101 determines that a wireless LAN connection request has been received, the control unit 101 executes S503, otherwise executes S502.

In S502, the control unit 101 determines whether or not the user has given thereto an instruction to activate the access point function (to generate a wireless LAN network). The user can give an instruct to activate the access point function by, for example, operating a menu screen displayed on the display unit 106, through the operation unit 105.

If the control unit 101 determines that the user has given an instruction to activate the access point function (to generate a wireless LAN network), the control unit 101 executes S507, otherwise executes S501.

In S507, the control unit 101 displays, for example, on the display unit 106, a setting screen for setting connection information regarding the wireless LAN network (access point) to be generated by the digital camera 100. The setting screen is configured so that the user can set connection information (for example, the SSID and the password) using the operation unit 105.

When the control unit 101 detects an operation performed on the execution (enter) button on the setting screen or the operation unit 105, the control unit 101 stores the connection information entered on the setting screen in the nonvolatile memory 103. Thereafter, the control unit 101 executes S504. Note that when detecting an operation performed on the cancel button on the setting screen or the operation unit 105, the control unit 101 may terminate S507 and execute S501.

Note that, in this example, when the user gives an instruction to generate a wireless LAN network, the user is prompted to set connection information regarding the wireless LAN network (access point) to be generated by the digital camera 100. However, connection information that has been set in advance may be used. In this case, in S507, the control unit 101 may display, on the display unit 106, a screen asking the user regarding whether or not to permit the generation of a wireless LAN network. Thereafter, if the control unit 101 detects an input that allows a wireless LAN network to be generated, the control unit 101 executes S504, and if the control unit 101 detects an input that does not allow a wireless LAN network to be generated, the control unit 101 executes S501.

Meanwhile, in S503, the control unit 101 transmits a wireless LAN connection response and connection information for joining the wireless LAN network to be generated by the digital camera 100 to the smartphone 200, using BLE communication through the near field communication unit 112. The connection information includes the SSID and password of the access point. Note that the connection information transmitted in this example may be stored in the nonvolatile memory 103 in advance, or may be automatically generated by the control unit 101. When the control unit 101 automatically generates connection information, the control unit 101 stores the generated connection information in the nonvolatile memory 103. There are no particular restrictions on the method for automatically generating the SSID and the password, and any known method may be used.

In S503, in order to respond to the wireless LAN connection request within a reasonable time, the control unit 101 transmits the stored connection information or automatically generated connection information to the smartphone 200 without the user setting the connection information. Thereafter, the control unit 101 executes S504.

In S504, the control unit 101 activates the access point function of the connection unit 111, using the connection information stored in the nonvolatile memory 103. If this step is executed via S503, the connection information prepared in S503 is used. If this step is executed via S507, the connection information prepared in S507 is used. The connection unit 111 activates the wireless LAN access point (AP) function in response to an instruction from the control unit 101 and starts operating as an AP. The connection unit 111 serving as an AP periodically transmits a beacon including the SSID included in the connection information.

When the control unit 101 receives a request to join the wireless LAN network from an external device through the connection unit 111, the control unit 101 determines whether or not the password included in the join request matches the password included in the connection information stored in the nonvolatile memory 103. Thereafter, if the control unit 101 determines that the passwords match, the control unit 101 allows the external device to join the network, otherwise the control unit 101 denies the external device from joining the network.

When the generation of the wireless LAN network by the connection unit 111 is completed in S504, the control unit 101 executes S505 without waiting for a connection request to be received from the smartphone 200 via the wireless LAN. In S505, the control unit 101 determines whether the wireless LAN network has been generated in response to a request received from the external device (smartphone 200) or in response to a user instruction (operation performed on the operation unit 105). The control unit 101 can perform this determination based on, for example, whether or not the connection information has been transmitted to the smartphone 200 (whether or not S503 has been executed), but the determination may be performed using another method.

If the control unit 101 determines that the wireless LAN network has been generated in response to a request from an external device (smartphone 200), the control unit 101 executes S506, otherwise the control unit 101 waits for a request from the smartphone 200 to join the network via the wireless LAN instead of executing S506.

In S506, the control unit 101 notifies the smartphone 200 that the generation of the wireless LAN network is complete, using BLE communication through the near field communication unit 112. This notification notifies the smartphone 200 that the smartphone 200 has become connectable to the generated wireless LAN network. From this point on, the control unit 101 expects that the smartphone 200 will send a request to join the network via the wireless LAN, and waits for the join request to be received.

This notification allows the smartphone 200 (control unit 201) to know that the digital camera 100 has completed the generation of a wireless LAN network in response to the transmitted wireless LAN connection request. Therefore, the control unit 201 does not need to perform any operation to know whether or not the digital camera 100 has generated a wireless LAN network, such as repeatedly transmitting a join request. Therefore, it is possible to prevent the smartphone 200 from consuming power unnecessarily. It is also possible to reduce the waiting time to join a wireless LAN network.

On the other hand, if a wireless LAN network is generated in response to a user instruction, the digital camera 100 does not notify the smartphone 200 that the generation of the wireless LAN network has been completed. This is because the smartphone 200 has not requested a connection to the wireless LAN network. Thereafter, when receiving a wireless LAN connection request from the smartphone 200, the control unit 101 may notify the smartphone 200 that the wireless LAN network has been generated, together with the connection information.

Wireless LAN Connection Operation by Smartphone

Figure 4:
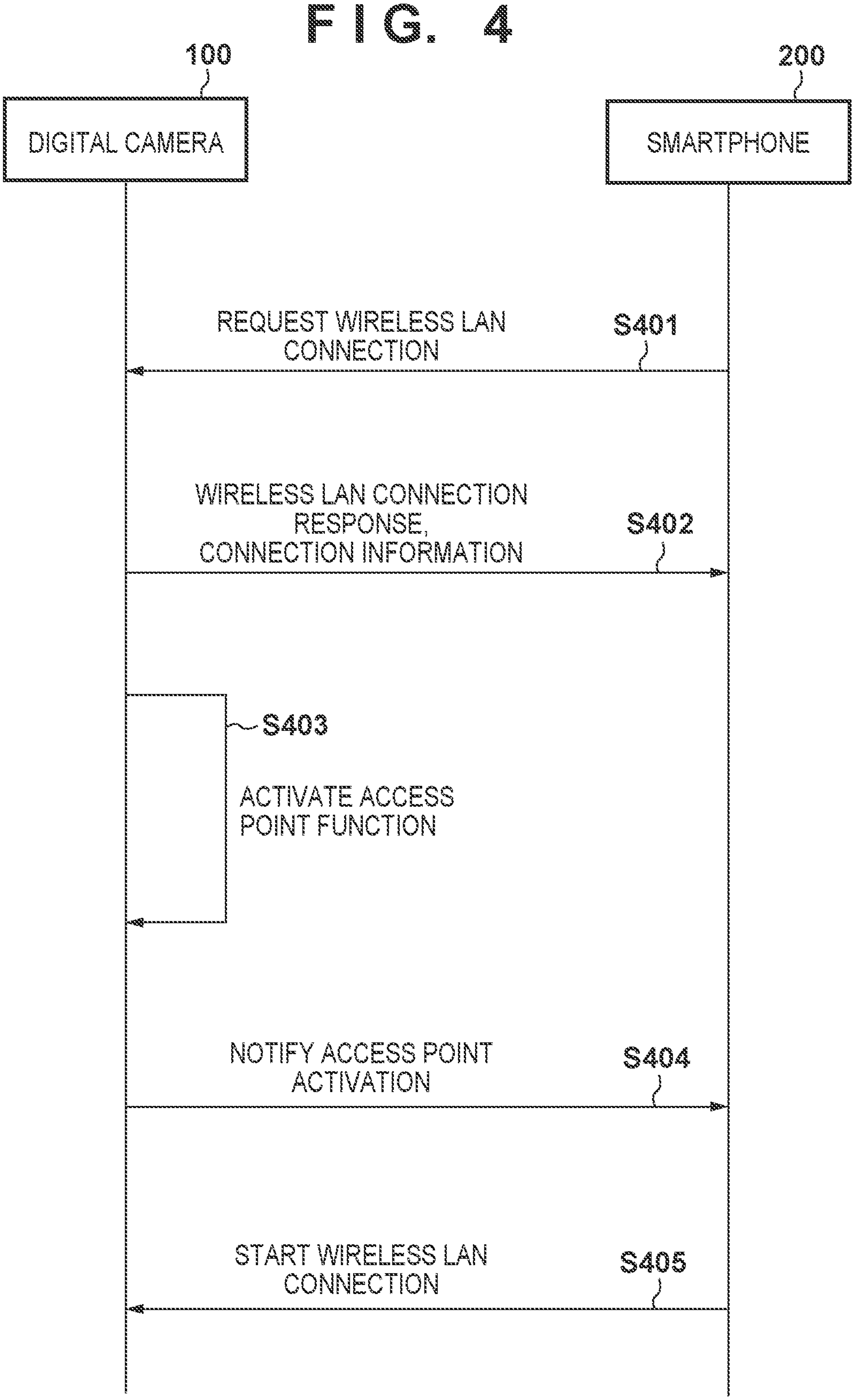
FIG. 4 is a sequence diagram for wireless LAN connection according to an embodiment.
Figure 6:
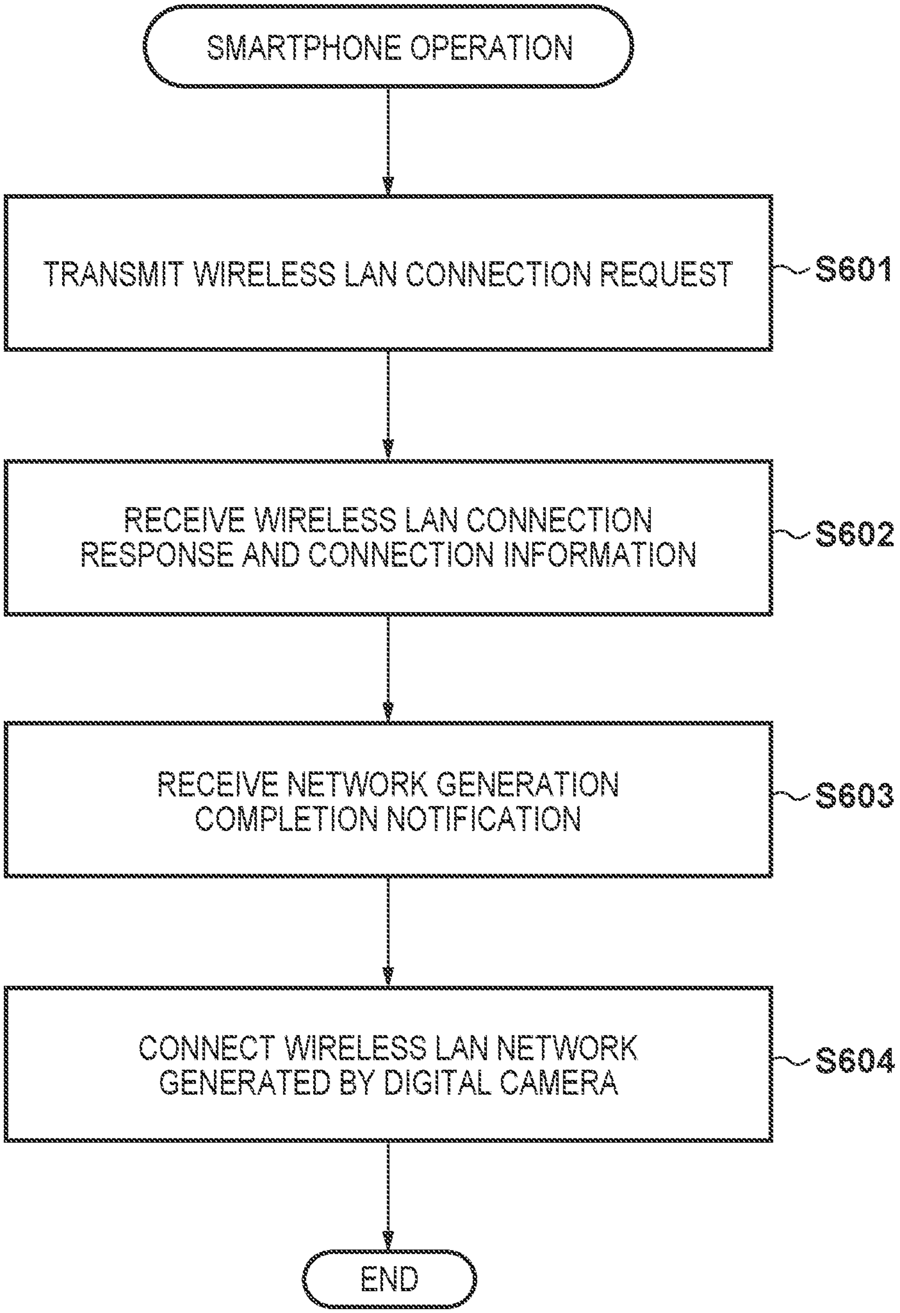
FIG. 6 is a flowchart for a wireless LAN connection operation of a smartphone according to the first embodiment.

FIG. 6 is a flowchart for the operation of the smartphone 200 corresponding to the sequence diagram in FIG. 4. Note that the processing described below is realized by the control unit 201 of the smartphone 200 executing a program to control the components of the smartphone 200.

The processing shown in the flowchart in FIG. 6 is performed while the control unit 201 is operable and a BLE connection is established with an external device (the digital camera 100 in this example) through the near field communication unit 209.

In S601, the control unit 201 transmits a wireless LAN connection request to the digital camera 100, using BLE communication through the near field communication unit 209. Note that the wireless LAN connection request is transmitted through an operation performed within a remote control application for the digital camera 100 running on the smartphone 200, for example. A wireless LAN connection request can be transmitted when, for example, an operation that requires high-speed communication is to be performed. For example, there may be a case where a live view image on the digital camera 100 is to be displayed on the smartphone 200, and a case where an image stored in the recording medium 110 is viewed or downloaded on the smartphone 200. Note that these are merely examples, and the wireless LAN connection request may be transmitted based on other conditions.

In S602, the control unit 201 transmits a wireless LAN connection request and connection information from the digital camera 100, using BLE communication through the near field communication unit 209. The control unit 201 stores the received connection information in the nonvolatile memory 203.

Thereafter, the control unit 201 waits to receive a wireless LAN network generation completion notification. While waiting, the control unit 201 does not perform any communication to confirm whether or not a wireless LAN network has been generated by the digital camera 100, such as a wireless LAN join request using the connection information received from the digital camera 100 in S602.

In S603, the control unit 201 receives the wireless LAN network generation completion notification from the digital camera 100, using BLE communication through the near field communication unit 209.

Next, in S604, the control unit 201 transmits a wireless LAN join request using the connection information received from the digital camera 100 in S602 to the digital camera 100, using wireless LAN communication through the connection unit 208. Once the smartphone 200 is allowed to join the wireless LAN network generated by the digital camera 100, the smartphone 200 can perform wireless LAN communication with the digital camera 100 through the connection unit 208.

As described above, according to the present embodiment, when a wireless communication device capable of generating a wireless network generates a wireless network in response to a request from an external device, the request source external device is notified of the completion of the generation of a wireless network. As a result, it is possible to reduce power consumption and waiting time of the request source external device.

Second Embodiment

Next, a second embodiment of the present invention will be described. In the first embodiment, the control unit 101 of the digital camera 100 is configured to not notify the external device (smartphone 200) of the completion of the generation of a wireless LAN network when the wireless LAN network is generated in response to an operation on the operation unit 105. In contrast, in the present embodiment, the external device (smartphone 200) is notified of the completion of the generation of a wireless LAN network even when a wireless LAN network is generated in response to an operation on the operation unit 105.

The operation of the digital camera 100 in the present embodiment is realized by simply skipping the branch processing in S505 in FIG. 5, and therefore the description thereof will be omitted. However, the destination of the wireless LAN network generation completion notification transmitted in S506 is different when the wireless LAN network is generated in response to a request from an external device and when the wireless LAN network is generated in response to an operation on the operation unit 105. When a wireless LAN network is generated in response to a request from an external device, the destination of the wireless LAN network generation completion notification is the request source external device. On the other hand, when a wireless LAN network is generated in response to an operation on the operation unit 105, a wireless LAN network generation completion notification may be broadcast.

Wireless LAN Connection Operation by Smartphone

Figure 7:
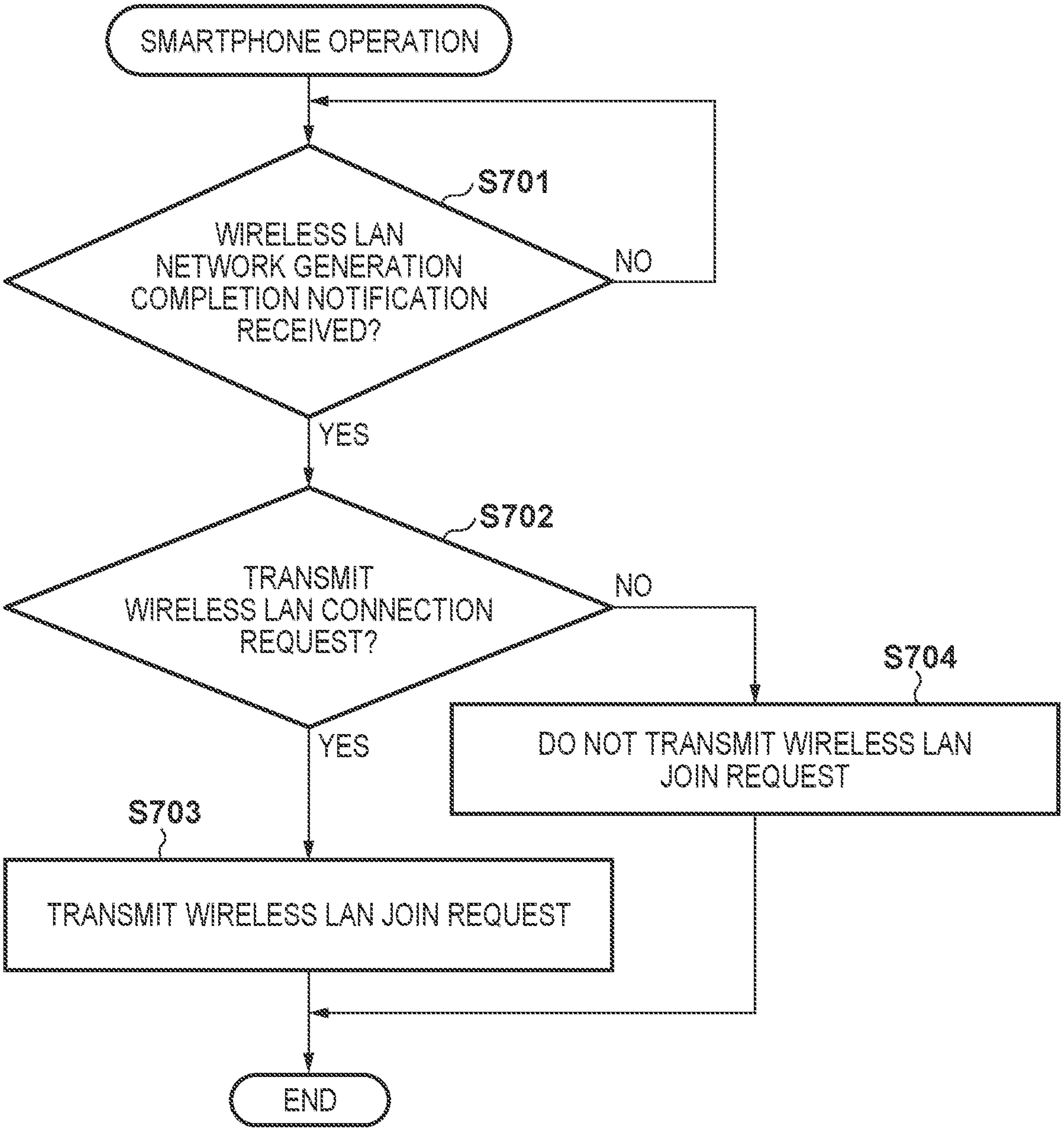
FIG. 7 is a flowchart for a wireless LAN connection operation of a smartphone according to a second embodiment.

FIG. 7 is a flowchart for the operation of the smartphone 200 according to the present embodiment. Note that the processing described below is realized by the control unit 201 of the smartphone 200 executing a program to control the components of the smartphone 200.

The processing shown in the flowchart in FIG. 7 is performed while the control unit 201 is operable and a BLE connection is established with an external device (the digital camera 100 in this example) through the near field communication unit 209.

In S701, the control unit 201 determines whether or not a wireless LAN network generation completion notification has been received from the digital camera 100, using BLE communication through the near field communication unit 209. If the control unit 201 determines that a wireless LAN network generation completion notification has been received, the control unit 201 executes S702, otherwise the control unit 201 executes S701 again.

In S702, the control unit 201 determines whether or not a wireless LAN connection request has been transmitted to the digital camera 100. This operation corresponds to determining whether or not the received wireless LAN network generation completion notification is a notification provided in response to the wireless LAN connection request transmitted from the control unit 201. If the control unit 201 determines that a wireless LAN connection request has been transmitted to the digital camera 100, the control unit 201 executes S703, otherwise the control unit 201 executes S704. Note that the determination may be made based on whether the received wireless LAN network generation completion notification is a broadcast message or a message addressed to the smartphone 200.

In S703, the control unit 201 transmits a wireless LAN join request to the digital camera 100 in the same manner as in S604 in the first embodiment. If the wireless LAN network generation completion notification is a notification provided in response to the wireless LAN connection request transmitted to the digital camera 100, the control unit 201 can use the received connection information to transmit a wireless LAN join request.

On the other hand, in S704, the control unit 201 does not transmit a wireless LAN join request to the digital camera 100. If the wireless LAN network generation completion notification is not a notification provided in response to the wireless LAN connection request transmitted to the digital camera 100, it can be considered that the wireless LAN network has been generated in response to an operation (user instruction) on the operation unit 105 of the digital camera 100.

For example, as shown in FIG. 3, there may be another external device (the smartphone 300) that can communicate with the digital camera 100 using wireless LAN communication. If the smartphone 300 is not connected to the digital camera 100 using BLE communication, it is necessary to operate the digital camera 100 to generate a wireless LAN network and manually connect the smartphone 300 to the wireless LAN network.

In such a case, if the smartphone 200 transmits a wireless LAN join request in response to receiving a wireless LAN network generation completion notification, the smartphone 300 may not be able to join the wireless LAN network of the digital camera 100. Therefore, the smartphone 200 according to the present embodiment is configured to transmit a wireless LAN join request when receiving a wireless LAN network generation completion notification in response to a wireless LAN connection request transmitted by the smartphone 200.

According to the present embodiment, when another external device is to be manually connected to a wireless network generated by a wireless communication device, the effect of preventing such connection from being interfered with can be achieved in addition to the effects of the first embodiment.

According to one aspect of the embodiments, it is possible to provide a wireless communication device that realizes efficient switching between wireless communication schemes, and a control method therefor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A wireless communication device comprising:
a first wireless communication circuit;
a second wireless communication circuit; and
a controller,
wherein the controller notifies an external device, using the second wireless communication circuit, that the external device becomes connectable to a network generated by the first wireless communication circuit.

2. The wireless communication device according to claim 1,
wherein
the controller provides the notification when the network is generated in response to a request from the external device, and does not provide the notification when the network is not generated in response to the request from the external device.

3. The wireless communication device according to claim 2,
wherein the request is received through the second wireless communication circuit.

4. The wireless communication device according to claim 2,
wherein when the network is not generated in response to the request from the external device is when the network is generated in response to an operation on the wireless communication device.

5. The wireless communication device according to claim 1,
wherein the second wireless communication circuit uses a wireless communication scheme that has a shorter communication range than a wireless communication scheme used by the first wireless communication circuit, to communicate with the external device.

6. A wireless communication device comprising:
a first wireless communication circuit;
a second wireless communication circuit; and
a controller,
wherein when the controller receives a notification indicating that a network that is connectable by the first wireless communication circuit has been generated, from an external device through the second wireless communication circuit, responsive to determining that the notification is a notification provided in response to a request transmitted to the external device, the controller transmits a request to join the network to the external device, using the first wireless communication circuit, and responsive to determining that the notification is not a notification provided in response to the request, the controller does not transmit a request to join the network to the external device, using the first wireless communication circuit.

7. The wireless communication device according to claim 6, wherein the controller determines that the notification is a notification provided in response to the request when the notification is addressed to the wireless communication device.

8. The wireless communication device according to claim 6, wherein the controller determines that the notification is not a notification provided in response to the request when the notification is a broadcast message.

9. The wireless communication device according to claim 6, wherein the second wireless communication circuit uses a wireless communication scheme that has a shorter communication range than a wireless communication scheme used by the first wireless communication circuit, to communicate with the external device.

10. A control method for a wireless communication device that includes first wireless communication circuit and second wireless communication circuit, comprising:

notifying an external device, using the second wireless communication circuit, that the external device becomes connectable to a network generated by the first wireless communication circuit.

11. A control method for a wireless communication device that includes first wireless communication circuit and second wireless communication circuit, comprising:

receiving, by the second wireless communication circuit, from an external device, a notification indicating that a network that is connectable by the first wireless communication circuit has been generated;

responsive to determining that the notification is a notification provided in response to a request transmitted to the external device, transmitting a request to join the network to the external device, using the first wireless communication circuit; and responsive to determining that the notification is not a notification provided in response to the request, not transmitting the request to join the network to the external device.

12. A non-transitory computer-readable medium storing a program that, when executed by a computer included in a wireless communication device that includes first wireless communication circuit and second wireless communication circuit, causes the computer to notify external device, using the second wireless communication circuit, that the external device becomes connectable to a network generated by the first wireless communication circuit.

* * * * *